(12) United States Patent
Kellner et al.

(10) Patent No.: US 8,073,582 B2
(45) Date of Patent: Dec. 6, 2011

(54) SYSTEM AND METHOD FOR ESTABLISHING A WIRELESS-BASED COMMUNICATION LINK BETWEEN A PAIR OF LOCOMOTIVES

(75) Inventors: Steven Andrew Kellner, Melbourne, FL (US); Eugene A. Smith, Satellite Beach, FL (US); James Glen Corry, West Melbourne, FL (US); Robert Palanti, Melbourne, FL (US); Robert L. Moffitt, Palm Bay, FL (US); Brian Staton, Palm Bay, FL (US); Brian Joseph McManus, Melbourne, FL (US); Frank Richard Wawrzyniak, Rockledge, FL (US); Stephen Shelton, Sebastian, FL (US); Carlos Paulino, Melbourne, FL (US)

(73) Assignee: General Electric Company, Schenectady, NY (US)

( * ) Notice: Subject to any disclaimer, the term of this patent is extended or adjusted under 35 U.S.C. 154(b) by 431 days.

(21) Appl. No.: 12/427,042

(22) Filed: Apr. 21, 2009

(65) Prior Publication Data

US 2009/0204278 A1    Aug. 13, 2009

Related U.S. Application Data

(63) Continuation-in-part of application No. 11/422,458, filed on Jun. 6, 2006, now abandoned.

(51) Int. Cl.
 *G05D 1/00* (2006.01)
(52) U.S. Cl. .......................................... 701/19
(58) Field of Classification Search .............. 701/2, 19, 701/20, 33; 246/167 R, 186, 187 A
See application file for complete search history.

(56) References Cited

U.S. PATENT DOCUMENTS

| 4,582,280 | A | 4/1986 | Nichols et al. | |
|---|---|---|---|---|
| 6,401,015 | B1 * | 6/2002 | Stewart et al. | 701/19 |
| 6,972,670 | B2 | 12/2005 | LaDuc et al. | |
| 6,975,927 | B2 * | 12/2005 | Szklar et al. | 701/19 |
| 2005/0065673 | A1 * | 3/2005 | Horst et al. | 701/19 |

* cited by examiner

*Primary Examiner* — Kim T Nguyen
(74) *Attorney, Agent, or Firm* — Cian G. O'Brien, Esq.; Robert Wawrzyn, Esq.; Beusse Wolter Sanks Mora & Maire, P.A.

(57) ABSTRACT

A system is provided for establishing a wireless-based communication link between a lead locomotive and a remote locomotive. A user on the lead locomotive is prompted to input a railroad and number identifier of the remote locomotive. A link command signal is transmitted from the lead locomotive, based on a predetermined number identifier of the lead locomotive, and the inputted railroad and number identifier. A second processor on the remote locomotive respectively compares the predetermined number identifier of the lead locomotive, the inputted railroad and number identifier of the lead locomotive, with an inputted number identifier of the lead locomotive, a predetermined railroad and a predetermined number identifier of the remote locomotive. A link reply signal, is transmitted from the remote locomotive, based on the comparison performed by the second processor, to establish the communication link. Additionally, a method is provided for establishing the wireless-based communication link.

20 Claims, 11 Drawing Sheets

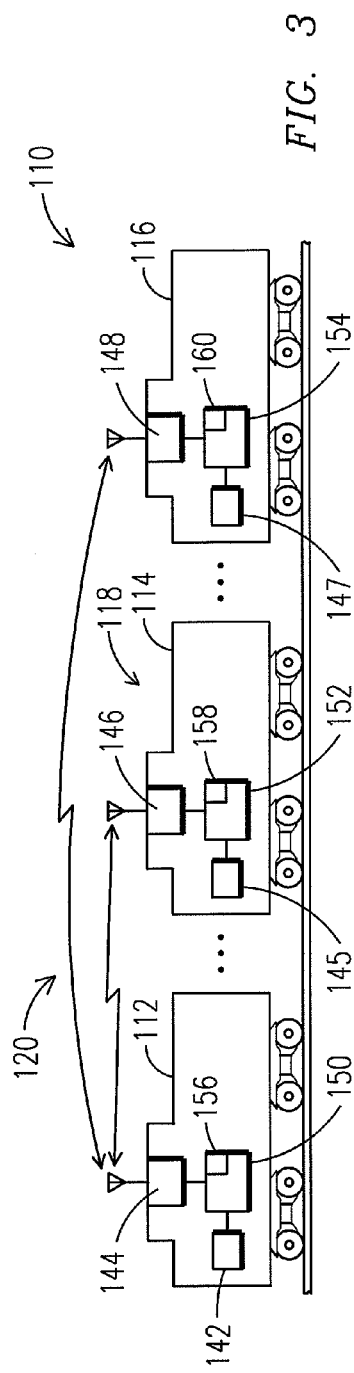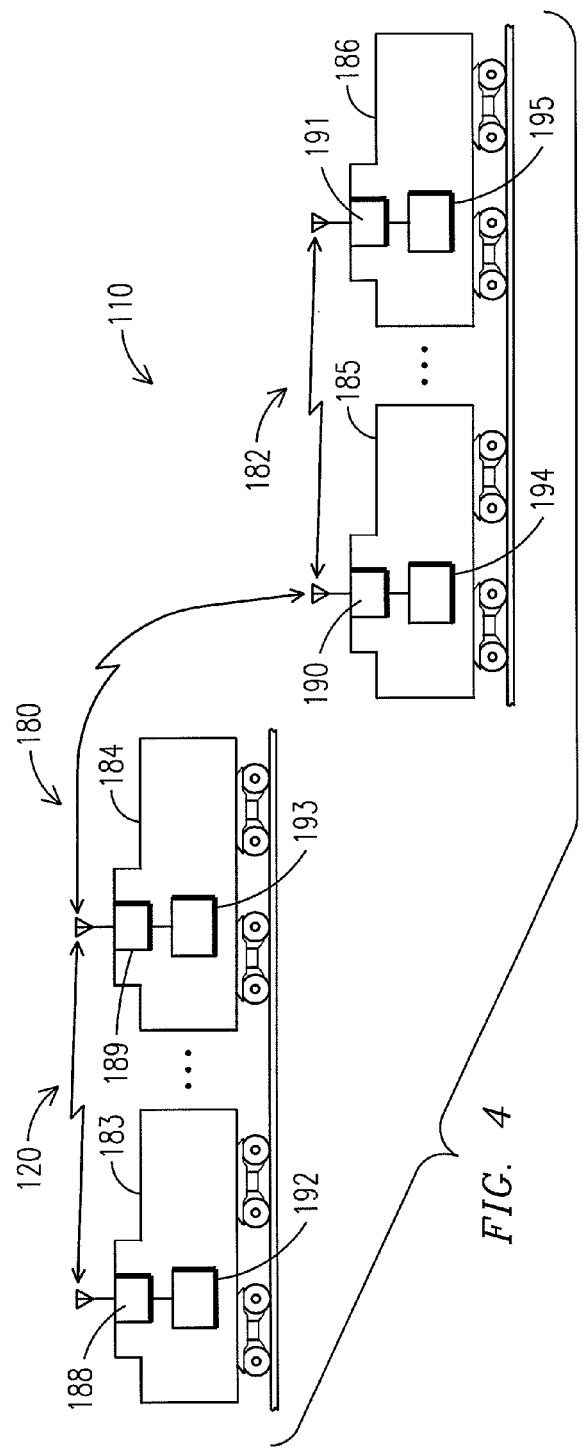

| Radio Version Code | Alaska | BNSF | BC Rail | CN | CP Rail | Ferromex | Ferrosur | KCS/TFM | NS | QNS&L | UP |
|---|---|---|---|---|---|---|---|---|---|---|---|
| 2 | | | | | X | | | | | | |
| 17 | | X | | | | | | | | X | |
| 101 | | X | | | | | | | | | |
| 103 | | | | | | | | X | | | X |
| 104 | | | | | | X | X | | | | |
| 106 | | | | | | | | X | | | |
| 111 | | | X | | | | | | | | |
| 112 | | | | | | | | | X | | |
| 114 | X | | | | | | | | | | |
| 115 | | | | X | | | | | | | |

FIG. 5

Railroad | Recommended ID
--- | ---
— BNSF | BN OR BNSF
— BC Rail | BC OR BCR
— Canadian National | CN
— Canadian Pacific | CP OR CPR
— Ferromex | FM
— Ferrosur | FS
— KCS | KC OR KCS
— TFM | TF OR TFM
— Norfolk Southern | NS
— Union Pacific | UP

FIG. 9

SYSTEM AND METHOD FOR ESTABLISHING A WIRELESS-BASED COMMUNICATION LINK BETWEEN A PAIR OF LOCOMOTIVES

CROSS-REFERENCE TO RELATED APPLICATIONS

This application claims priority to and is a Continuation-In-Part of U.S. application Ser. No. 11/422,458 filed Jun. 6, 2006 now abandoned, and is incorporated herein by reference in its entirety.

BACKGROUND OF THE INVENTION

Trains are commonly used as an efficient means for hauling cargo and/or passengers over long distances. A typical train includes a plurality of non-powered rail cars and a plurality of locomotives for moving the non-powered rail cars along a track. Two or more locomotives grouped or otherwise controlled together for traction purposes are commonly referred to as a "consist." Distributed power train operation involves controlling the supply of motive power produced by a lead locomotive (or lead consist) and one or more remote locomotives (or consists) that may be spaced apart from the lead locomotive and distributed throughout the train. Each locomotive of the train may be equipped with a communication system for providing wireless communications. Braking and traction commands may be issued to the remote locomotives via a communication link responsive to an operator using the controls at the lead locomotive. The communication link may include a wireless link between the lead locomotive and the remote locomotives maintained by the communication system.

A conventional communications linking procedure is established for setting up train communications between a lead locomotive and one or more remote locomotives for distributed power operation. Each locomotive is assigned to a respective railroad and transmits signals over the communication link using a respective radio version code, based on its respective railroad. Additionally, each locomotive is assigned a respective number identifier or road number, to distinguish it from other locomotives within the respective railroad. A link command signal is transmitted from the lead locomotive, which includes the radio version code of the lead locomotive, the number identifier of the lead locomotive, and the number identifier of the remote locomotive to which the lead locomotive intends to establish a communications link. Subsequent to receiving the link command signal, the remote locomotive verifies that the radio version code within the link command signal matches its own radio version code, that the number identifier of the remote locomotive within the link command signal matches its own number identifier, and that the number identifier of the lead locomotive within the link command signal matches an expected number identifier of the lead locomotive. If these comparisons are valid, the remote locomotive transmits a link reply signal to establish the communications link.

In the conventional procedure, since the radio version code of the lead and remote locomotive must match in order to establish the communications link, the lead and remote locomotive must belong to a common railroad. However, this introduces a noticeable drawback, as it prevents lead and remote locomotives from different railroads with different version codes from establishing a distributed power communications link. A solution was proposed to address this drawback, which creates a new radio version code that encompasses the two or more railroads between which the communications link is to be established. Thus, the remote locomotive would recognize the common radio version code in the link command signal. However, this proposed solution also introduces several drawbacks, as establishing a communications link between locomotives from two or more railroads will inherently involve the possibility of a lead and a remote locomotive having duplicate number identifiers. The proposed solution does not account for potential safety hazards introduced by this scenario. For example, if a lead and remote locomotive from different railroads have the same number identifier, the proposed solution includes a safety interlock to prohibit any communication link between these locomotives, and thus reduces its application scope. Additionally, for example, if a lead locomotive attempts to link to a first remote locomotive, while a nearby second remote locomotive has the same number identifier as the first remote locomotive, both remote locomotives may establish a communication link with the lead locomotive, based on the comparison of the common number identifier in the link command signal with their respective number identifier. Thus, the second remote locomotive may unintentionally respond to command signals from the lead locomotive after the communications link has been established, such as an emergency brake application signal, even though the second remote locomotive is located on a different train than the lead locomotive.

Heretofore, when a lead locomotive attempts to establish a communications link with one or more remote locomotive(s), conventional systems have prohibited a communications link among locomotives from different railroads. Additionally, a proposed solution to permit such communications link among locomotives from different railroads poses several drawbacks and safety risks, as the communications link procedure merely considers the number identifier, and not the particular railroad to which each locomotive belongs. It would be advantageous to provide a system that introduces a communications linking procedure that permits locomotives from different railroads to establish a communication link, while reducing these noted drawbacks.

BRIEF DESCRIPTION OF THE INVENTION

An embodiment of the present invention relates to a distributed power linking system for establishing a communication link between a plurality of locomotives. The system comprises a first input interface positioned on a first locomotive, a first processor communicatively coupled to the first input interface, and a first transceiver. The first input interface is configured to receive locomotive identifiers. The locomotive identifiers comprise a number identifier (e.g., road number) and a railroad identifier both associated with a second locomotive. The railroad identifier is associated with an at least one of an owner or an operator of the second locomotive. The first processor is configured to generate a link command signal relating to the locomotive identifiers, e.g., the link command signal may include the locomotive identifiers. The first transceiver is configured to transmit the link command signal to the second locomotive and to receive a link reply signal from the second locomotive. The first processor is also configured to establish a distributed power communication link between the first locomotive and the second locomotive based on at least one of the link command signal and/or the link reply signal.

Another embodiment of the present invention provides a system for establishing a communication link (e.g., wireless communication link) between a pair of locomotives. The pair of locomotives includes a first and second locomotive, which are assigned a respective railroad identifier and a respective number identifier (e.g., road number). A first input interface is positioned on the first locomotive, and prompts a user to input the railroad identifier and number identifier of the second locomotive. A first transceiver is positioned on the first locomotive, and transmits a link command signal, based on a predetermined number identifier of the first locomotive, the inputted railroad identifier of the second locomotive, and the inputted number identifier of the second locomotive. A second input interface is positioned on the second locomotive, and prompts a user to input the number identifier of the first locomotive. A second transceiver is positioned on the second locomotive, and receives the link command signal. The second transceiver is coupled to a second processor, which respectively compares the predetermined number identifier of the first locomotive, the inputted railroad identifier of the second locomotive, and the inputted number identifier of the second locomotive (e.g., from the link command signal) with the inputted number identifier of the first locomotive (e.g., as inputted into the second input interface), a predetermined railroad identifier of the second locomotive, and a predetermined number identifier of the second locomotive. The second transceiver transmits a link reply signal, based on the comparisons performed by the second processor, to establish the communications link.

Another embodiment of the present invention provides a system for establishing a communication link (e.g., wireless communication link) between a lead locomotive and a remote locomotive. A first input interface is positioned on the lead locomotive, and prompts a user to input the railroad identifier of the remote locomotive and the number identifier (e.g., road number) of the remote locomotive. A link command signal is transmitted from the lead locomotive, based on a predetermined number identifier of the lead locomotive, the inputted railroad identifier of the remote locomotive and the inputted number identifier of the remote locomotive. The link command signal is received at the remote locomotive. A second input interface is positioned on the remote locomotive, and prompts a user to input the number identifier of the lead locomotive. A second processor is positioned on the remote locomotive, to respectively compare the predetermined number identifier of the lead locomotive, the inputted railroad identifier of the remote locomotive, and the inputted number identifier of the remote locomotive (e.g., from the link command signal) with the inputted number identifier of the lead locomotive, a predetermined railroad identifier of the remote locomotive and a predetermined number identifier of the remote locomotive. A link reply signal is transmitted from the remote locomotive, based on the comparison performed by the second processor, to establish the communication link.

Another embodiment of the present invention provides a method for establishing a communication link (e.g., wireless communication link) between a pair of locomotives including a first and second locomotive. The method comprises prompting a user on the first locomotive to input an assigned railroad identifier and an assigned number identifier (e.g., road number) of the second locomotive. The method further comprises prompting a user on the second locomotive to input an assigned number identifier of the first locomotive. Additionally, the method comprises transmitting a link command signal from the first locomotive, based on a predetermined number identifier of the first locomotive, the inputted railroad identifier of the second locomotive, and the inputted number identifier of the second locomotive. The method further comprises receiving the link command signal at the second locomotive. Additionally, the method comprises respectively comparing the predetermined number identifier of the first locomotive, the inputted railroad identifier of the second locomotive, and the inputted number identifier of the second locomotive with the inputted number identifier of the first locomotive, a predetermined railroad identifier of the second locomotive, and a predetermined number identifier of the second locomotive. The method further comprises transmitting a link reply signal from the second locomotive, based on the respectively comparing step, to establish the communication link.

BRIEF DESCRIPTION OF THE DRAWINGS

Embodiments of the present invention can be more easily understood and the further advantages and uses thereof more readily apparent, when considered in view of the following detailed description when read in conjunction with the following figures, wherein:

FIG. 3 is a schematic diagram of a system for establishing a wireless-based communication link between a pair of locomotives within a same train, in accordance with an exemplary embodiment of the present invention;

FIG. 4 is a schematic diagram of a system for establishing a wireless-based communication link between a pair of locomotives positioned within respective trains, in accordance with an exemplary embodiment of the present invention;

FIG. 5 is a table providing an example of radio version codes utilized by a respective plurality of railroads, in accordance with an exemplary embodiment of the present invention;

FIG. 9 is a table providing a sample list of railroad identifiers used for a respective plurality of railroads in accordance with an exemplary embodiment of the present invention;

DETAILED DESCRIPTION OF THE INVENTION

Recently, some railroads have begun using locomotives from different railroads that have compatible distributed power operating systems but may also have duplicate road numbers. Consequently, it may be possible to have locomotives with duplicate road numbers capable of communicating with each other within a railway fleet. In most cases duplicate road numbered locomotives will not cause problems with distributed power operations due to built-in safeguards. For example, the distributed power system may prevent linking when an attempt is made to enter a duplicate road number at either a remote locomotive or a lead locomotive. However, the present inventors have identified certain cases when duplicate road numbers may cause problems during a communications linking procedure. For example, when a lead locomotive attempts to link with a first remote locomotive having the same road number as a second remote locomotive of a train, both remote locomotives may link, but only the first linked remote locomotive will be recognized by the lead locomotive.

In another problematic situation recognized by the inventors, when first and second trains operating within each other's range of communication include respective lead locomotives having the same road numbers, and the first train includes a remote locomotive having the same road number as a remote locomotive of the second train, communication linking may be compromised. If both trains are set up to link, and the first train links first, the lead locomotive of the first train will link to the remote locomotives in both trains because they have the same road number and are both configured to link to the same lead road number. The lead locomotive of the first train may then have linked with both remote locomotives of the first train and the second train and may inadvertently operate the remote locomotive in the second train contrary to commands from the lead locomotive of the second train. Furthermore, if the lead locomotive of the second train attempts to link to its remote locomotive, the remote locomotives of both trains may unlink from the lead locomotive of the first train and relink to the lead locomotive of the second train, which may result in a communications loss indication provided to an operator of lead locomotive of the first train. To remedy such situations, the inventors have developed an innovative technique for controlling communications linking among locomotives so that duplicate road number conflicts among the locomotives are limited or eliminated.

In an exemplary embodiment, a method of controlling communications linking among locomotives may include identifying, during a communications linking procedure among locomotives, at least two of the locomotives having duplicate locomotive identifiers. The method may also include controlling an operation of at least one of the locomotives responsive to the identification of locomotives having duplicate locomotive identifiers.

Figure 1:
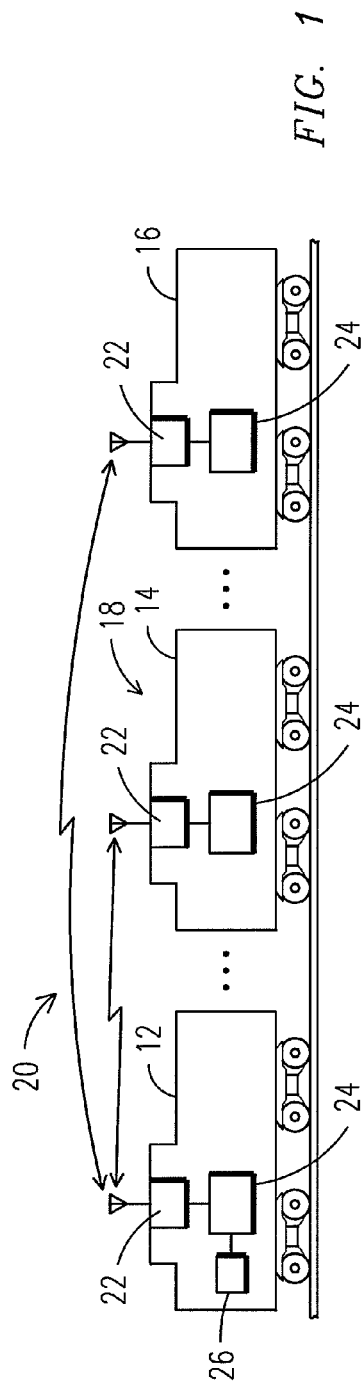
FIG. 1 is a schematic diagram of a system for controlling communication linking between a lead locomotive and remote locomotives within a same train, where the locomotives have duplicate road numbers, in accordance with an exemplary embodiment of the present invention.

FIG. 1 illustrates an exemplary embodiment of the invention directed to a lead locomotive 12 and remote locomotives 14, 16 of a train 18 in which the remote locomotives 14, 16 have duplicate identifiers, such as the same road number. (Embodiments of the invention are also applicable to off-highway vehicles generally.) However, the remote locomotives 14, 16 need not have a duplicate identifier in order to establish a communication link in accordance with the present invention. Each locomotive 12, 14, 16 may include a transceiver 22 for transmitting and receiving information over the communications link 20 and a processor 24 for processing received signals and generating information to be transmitted via the transceiver 22 over the communication link 20. A method for controlling communications linking among the locomotives 12, 14, 16 may include issuing a communications link request over communications link 20 from the lead locomotive 12 to the first remote locomotive 14 desired to be controlled by the lead locomotive 12. The method may further include receiving at the lead locomotive 12 a first reply from the first remote locomotive 14 and a second reply from a second remote locomotive 16 over the communication link 20 responsive to the link request. Upon receiving the two replies from the remote locomotives 14, 16, the lead locomotive 12 may limit further communications between the lead locomotive 12 and the first remote locomotive 14 and/or the second remote locomotive 16. For example, the lead locomotive 12 may unlink from either or both remote locomotives 14, 16. In another aspect, the method may include providing an indication to an operator of the lead locomotive 12 via display 26 to alert the operator that two remote locomotives having the same road number have been identified. The operator may then be prompted to take further action, such as switching out one the remote locomotives 14, 16.

In an aspect of the invention, one or more processors 24 may be configured for performing the above-described method. The steps necessary for accomplishing the method may be embodied in hardware, software, and/or firmware in any form that is accessible and executable by processor 24 and may be stored on any medium that is convenient for the particular application. Processor 24 may take any form known in the art, for example an analog or digital microprocessor or computer, and it may be integrated into or combined with one or more controllers used for other functions related to the locomotive operations.

Figure 2:
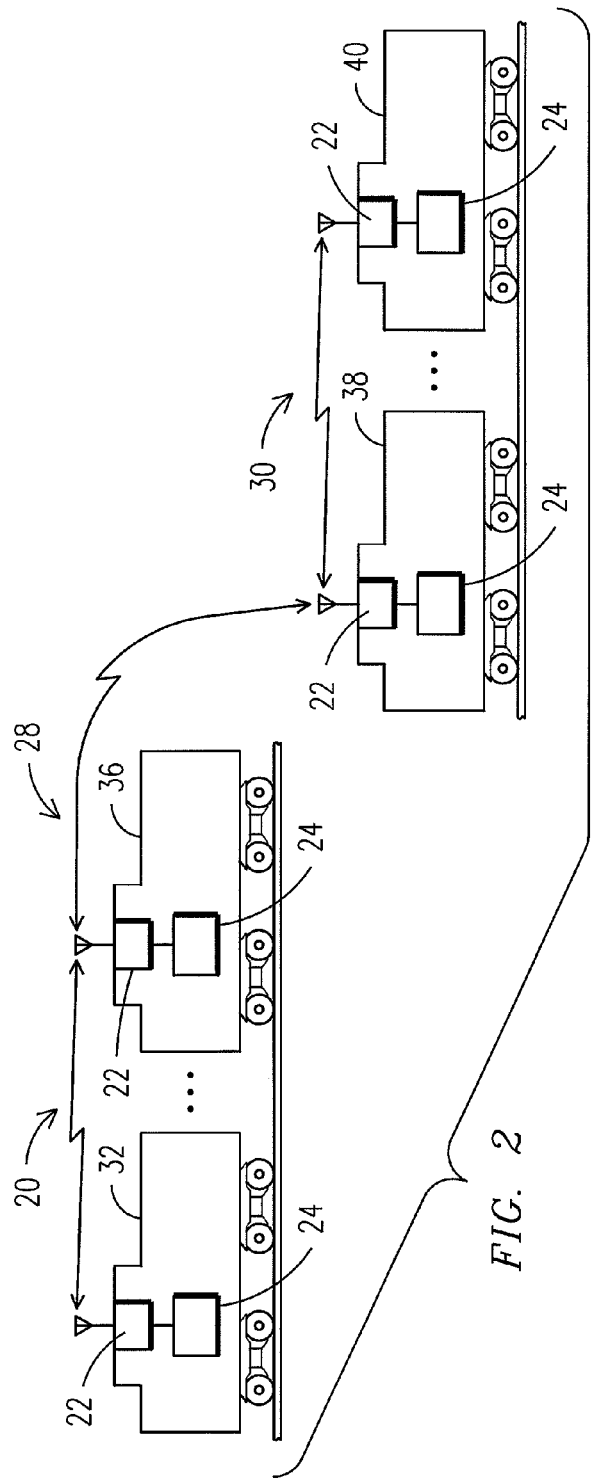
FIG. 2 is a schematic diagram of a system for preventing communication linking of a remote locomotive and lead locomotives within respective trains, where the locomotives have duplicate road numbers, in accordance with an exemplary embodiment of the present invention.

FIG. 2 illustrates another exemplary embodiment of the invention directed to first train 28 and second train 30 including train lead locomotives 32, 38 having the same lead locomotive road numbers. The trains 28, 30 also include train remote locomotives 36, 40 having the same remote locomotive road numbers. Each locomotive 32, 36, 38, 40 may include a transceiver 22 for transmitting and receiving information over the communications link 20 and a processor 24 for processing received signals and generating information to be transmitted via the transceiver 22 over the communication link 20. When such trains 28, 30 are operated sufficiently close such that a communication link 20 may be established between both trains 28, 30, communication linking problems may arise as a result of the duplicate lead road numbers and duplicate remote road numbers.

Accordingly, another exemplary communications linking control method may include ensuring, after being linked, that a remote locomotive responds only to its assigned lead locomotive responsive to a re-linking command. The method may include establishing a communications link between the first train lead locomotive 32 and the first train remote locomotive 36 desired to be controlled by the first train lead locomotive 32. The method may then include receiving, at the first train remote locomotive 36, a communications link request from a second train lead locomotive 38 within communications range. The link request may be encoded with a primary identifier of the second train lead locomotive 38, such as a road number that is the same as a primary identifier of the first train lead locomotive 32. The link request may also be encoded with a secondary identifier of the second train lead locomotive 38, such as railroad identifier code, different than a secondary identifier of the first train lead locomotive 32.

The link request may be intended for the second train remote locomotive 40 assigned to the second train lead locomotive 38, but may be recognized by the first train remote locomotive 36 due to the primary identifier encoded in the request being the same as the first train lead locomotive's primary identifier to which the first train remote 36 is already linked. The method may then include determining, at the first train remote locomotive 36, that the secondary identifier of the second train lead locomotive encoded in the communications link request is different than the secondary identifier of the first train lead locomotive 32 to which it is currently linked. The first train remote locomotive 36 may then ignore the communications link request from the second train lead locomotive 38 because the linking request has been issued from a locomotive different from the second train remote locomotive's assigned lead locomotive 32.

Based on the foregoing specification, the invention may be implemented using computer programming or engineering techniques including computer software, firmware, hardware or any combination or subset thereof, wherein the technical effect is to control communications linking among locomotives having duplicate road numbers. Any such resulting program, having computer-readable code means, may be embodied or provided within one or more computer-readable media, thereby making a computer program product, i.e., an article of manufacture, according to the invention. The computer readable media may be, for instance, a fixed (hard) drive, diskette, optical disk, magnetic tape, semiconductor memory such as read-only memory (ROM), etc., or any transmitting/receiving medium such as the Internet or other communication network or link. The article of manufacture containing the computer code may be made and/or used by executing the code directly from one medium, by copying the code from one medium to another medium, or by transmitting the code over a network.

One skilled in the art of computer science will easily be able to combine the software created as described with appropriate general purpose or special purpose computer hardware, such as a microprocessor, to create a computer system or computer sub-system embodying the method of the invention. An apparatus for making, using or selling the invention may be one or more processing systems including, but not limited to, a central processing unit (CPU), memory, storage devices, communication links and devices, servers, I/O devices, or any sub-components of one or more processing systems, including software, firmware, hardware or any combination or subset thereof, which embody the invention.

FIG. 3 illustrates a system 110 for establishing a wireless-based communication link 120 between a plurality of locomotives, such as a lead locomotive 112 and a first and second remote locomotive 114, 116 positioned on a train 118. The lead locomotive 112 and first and second remote locomotives 114, 116 are assigned a respective railroad identifier and a respective road number or other number identifier. For example, the lead locomotive 112 may be assigned with a railroad identifier "UP" and a number identifier "1000," which represents that the lead locomotive 112 belongs to the Union Pacific railroad and is assigned a number identifier (also known as a "road number" or "car number" or "unit number") of 1000. As appreciated by one of skill in the art, a respective railroad assigns a unique number identifier to each locomotive within its fleet. Similarly, the first remote locomotive 114 may be assigned with the "UP" railroad identifier and a number identifier "2000," which represents that the first remote locomotive 114 also belongs to the Union Pacific railroad and is assigned the number identifier 2000. Similarly, the second remote locomotive 116 may be assigned with a railroad identifier "BN" and a number identifier "2000," which represents that the second remote locomotive 116 belongs to the Burlington Northern railroad and is assigned the number identifier 2000. Thus, in one embodiment, each railroad identifier is uniquely associated with a respective railroad company (or other business entity), such that each locomotive owned by a particular railroad company is uniquely identified by the railroad identifier of the particular railroad company and the road number of the locomotive (which is uniquely assigned to the locomotive within the context of the particular railroad company).

As further illustrated in FIG. 3, an input interface 142 is positioned on the lead locomotive 112. When a user on the lead locomotive 112 wants to establish a communication link with the first remote locomotive 114, the input interface 142 is configured to prompt a user to input the railroad identifier and the number identifier of the first remote locomotive 114. Similarly, if the user on the lead locomotive 112 wants to establish a communication link with the second remote locomotive 116, the input interface 142 is configured to prompt a user to input the railroad identifier and number identifier of the second remote locomotive 116. Since the user on the lead locomotive 112 seeks to establish this communication link with the first remote locomotive 114, the railroad identifier and the number identifier of the first remote locomotive 114 is known. Additionally, to establish the communication link between the lead locomotive 112 and the first remote locomotive 114, an input interface 145 is illustrated in FIG. 3, and is positioned on the first remote locomotive 114. The input interface 145 is configured to prompt a user to input the number identifier of the lead locomotive 112. Additionally, to establish a communication link between the lead locomotive 112 and the second remote locomotive 116, an input interface 147 is illustrated in FIG. 3, and is positioned on the second remote locomotive 116. The input interface 147 is configured to prompt a user to input the number identifier of the lead locomotive 112.

As illustrated in FIG. 3, the input interface 142 is coupled to a processor 150 which includes a memory 156, and the memory 156 is programmed with a software code or radio version code such that a plurality of predetermined railroad identifiers are stored in the memory 156. FIG. 5 illustrates an exemplary table of various radio version codes, and the encompassing railroads whose predetermined railroad identifiers are included within each respective radio version code. For example, a processor programmed with radio version code version 103 would include those predetermined railroad identifiers of the KCS/TFM and Union Pacific (UP) railroads, stored in the memory of the processor, for example. Thus, one or more predetermined railroad identifiers are associated with each radio version code. When the memory is programmed with a particular radio version code, the predetermined railroad identifiers associated with that radio version code are stored in the memory as well. Although FIG. 5 lists various radio version codes and their encompassing railroads, the illustrated table is merely exemplary, and may be modified and expanded, based on updates to these radio version codes and the addition or deletion of railroads, for example.

Figure 6:
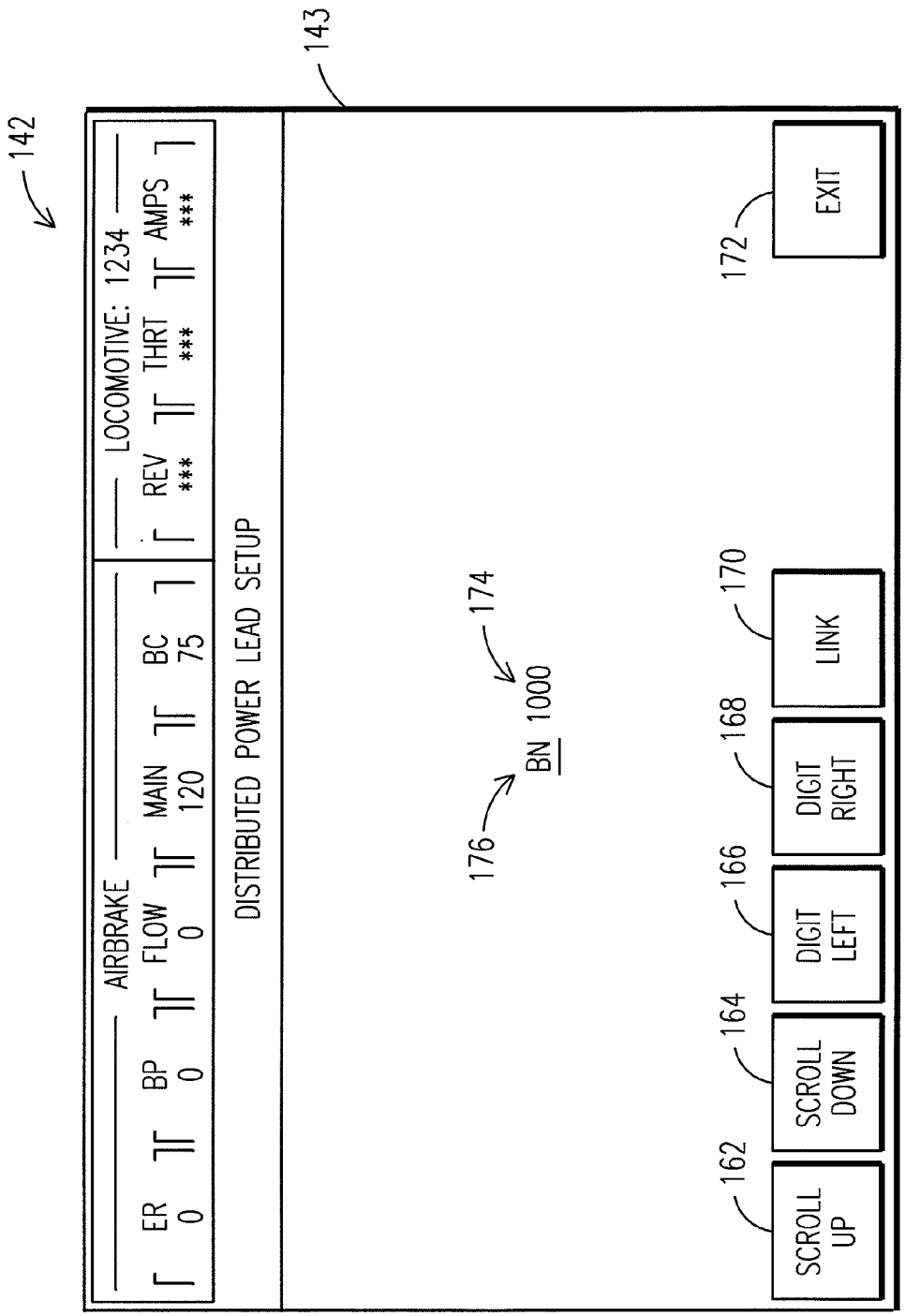
FIG. 6 is a plan view of an input device utilized within the system illustrated in FIGS. 3-4.

FIG. 6 illustrates the input interface 142, in accordance with an exemplary embodiment of the present invention. The input interfaces 145, 147 illustrated in FIG. 3 may include similar features and operate similarly to the input interface 142 discussed in this embodiment. However, the input interfaces 145, 147 may vary from the form or function of the input interface 142. As illustrated in FIG. 6, the input interface 142 includes a display 143, which outputs various images to the user. A plurality of softkeys 162, 164, 166, 168, 170, 172 are provided on the display 143, to assist the user on the lead locomotive 112 to input the railroad identifier 176 and the number identifier 174 of the first remote locomotive 114. (A softkey is a button, located on or alongside a display device, which performs a function dependent on the text shown near it at that moment on the display. The button may be a mechanical key, switch, sensor, etc. or a display-based button interface such as on a touch screen.) The user is initially prompted to input the railroad identifier 176 of the first remote locomotive 114, and is subsequently prompted to input the number identifier 174 of the first remote locomotive 114. In an exemplary embodiment, the railroad identifier is limited to a maximum number of alpha characters, such as three alpha characters, for example, and the number identifier is limited to a maximum number of numeric characters, such as four numeric characters, for example.

As illustrated in the exemplary embodiment of FIG. 6, the user is prompted to select the railroad identifier 176 of the first remote locomotive 114 from among the plurality of predetermined railroad identifiers stored in the memory 156. While the railroad identifier 176 is highlighted on the display 143, the user may activate the scroll up softkey 162 and/or the scroll down softkey 164, to alphabetically search through the predetermined railroad identifiers stored in the memory 156. Thus, the display 143 retrieves the predetermined railroad identifiers from the memory 156, as the user activates the scroll up softkey 162 and/or the scroll down softkey 164. When the railroad identifier of the first remote locomotive 114 is found among the predetermined railroad identifiers, the user may activate the digit left softkey 166 and/or the digital right softkey 168 to activate a character of the number identifier 174. Once a character of the number identifier 174 has been activated, the user may activate the scroll up softkey 162 and/or the scroll down softkey 164, to increase/decrease the value of each numeric character of the number identifier 174, until it corresponds with a respectively placed numeric character of the number identifier of the first remote locomotive 114. The user would then repeat this process for each numeric character of the number identifier 174, until the number identifier 174 of the first remote locomotive 114 is on the display 143. In an exemplary embodiment, the softkeys 162, 164, 166, 168 may be referred to as shift up, shift down, shift left, and shift right softkeys, for example.

Figure 7:
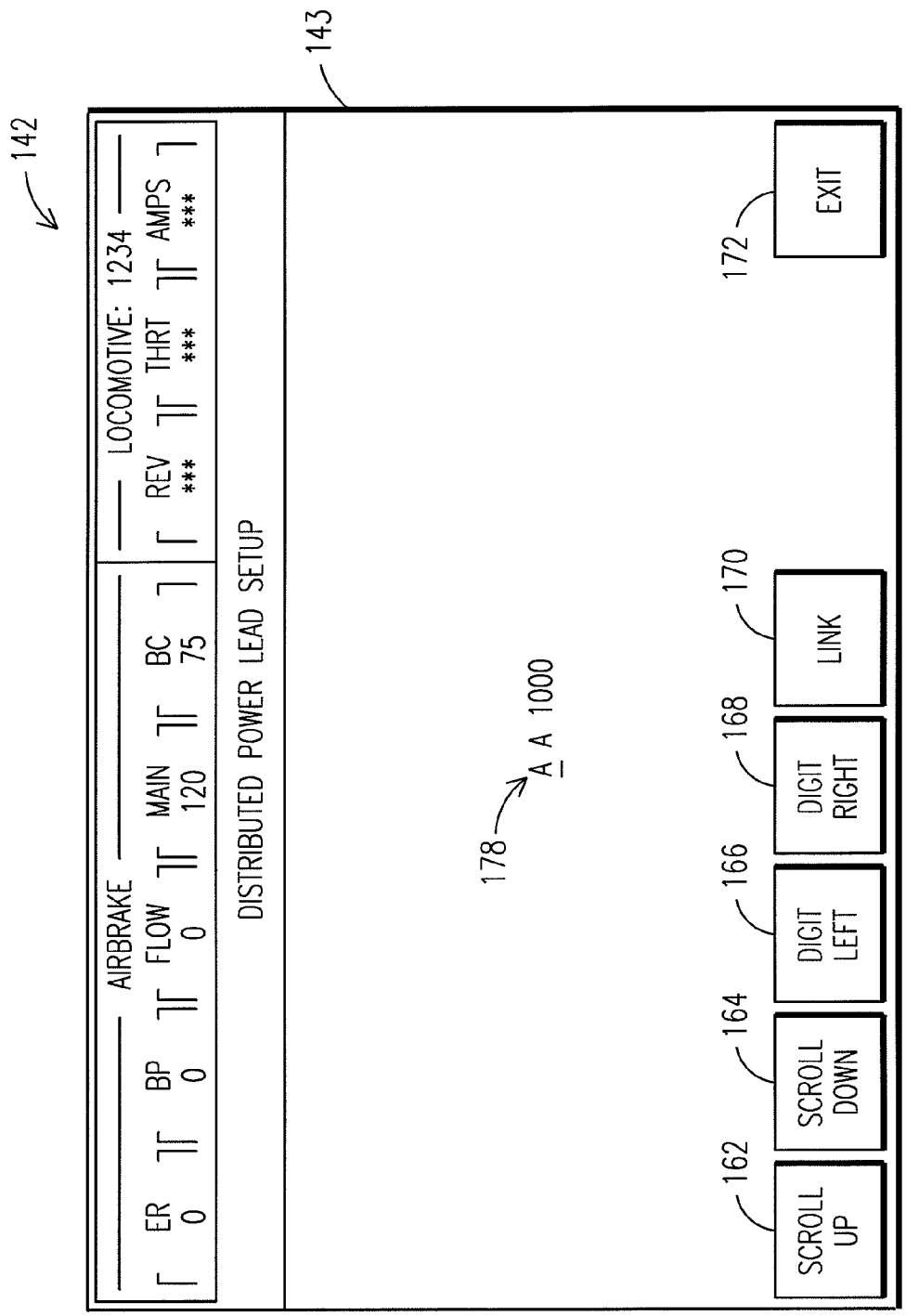
FIG. 7 is a plan view of an input device utilized within the system illustrated in FIGS. 3-4.
Figure 8:
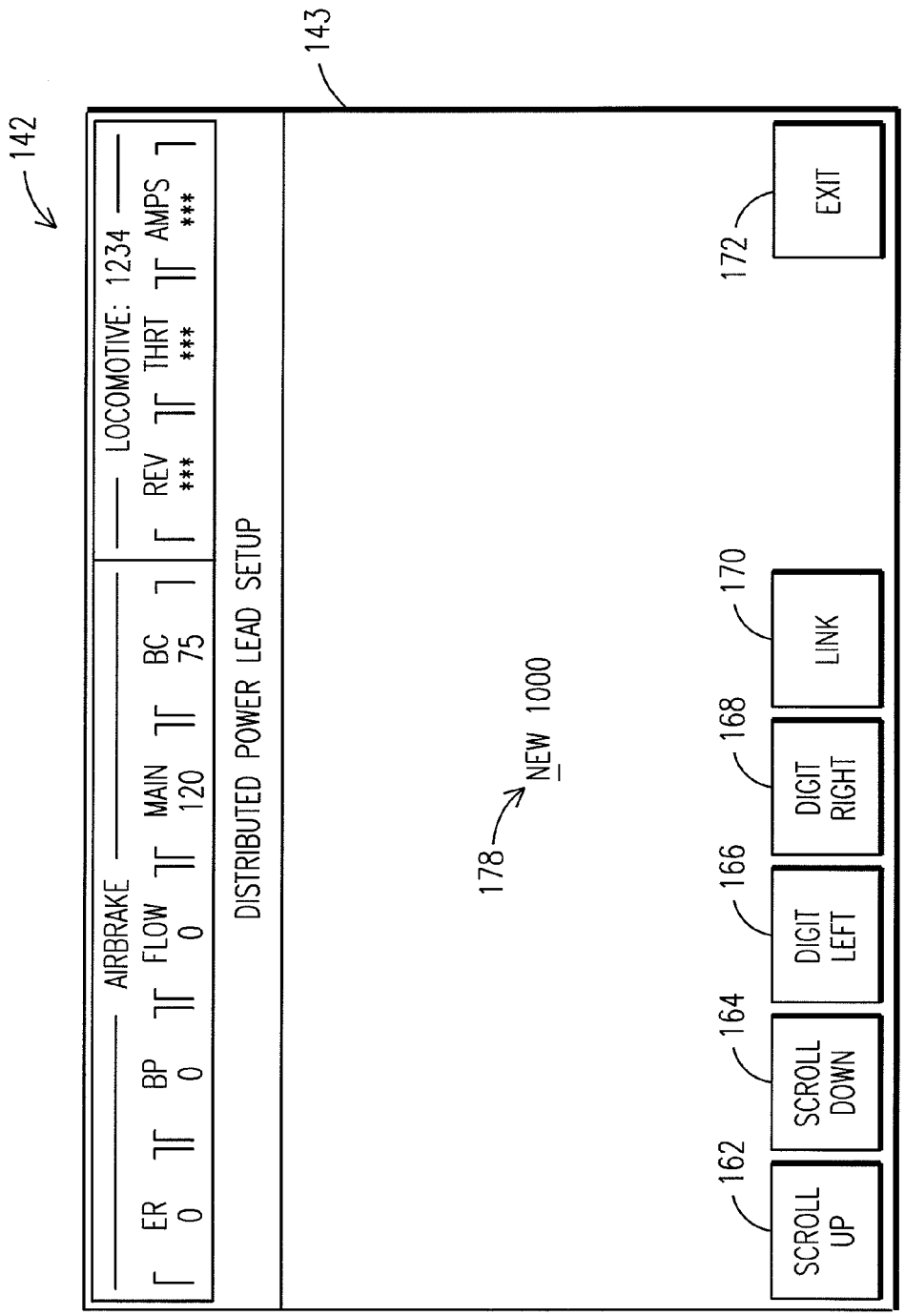
FIG. 8 is a plan view of an input device utilized within the system illustrated in FIGS. 3-4.

While the railroad identifier 176 is highlighted, and the user activates the scroll up softkey 162 and/or the scroll down softkey 164, the user searches the predetermined railroad identifiers stored in the memory 156, to determine if the railroad identifier of the first remote locomotive 114 is among the predetermined railroad identifiers. If the railroad identifier of the first remote locomotive 114 is not among the predetermined railroad identifiers, which are based on the software code programmed into the processor 150, the user is prompted to update the software code and add the railroad identifier of the first remote locomotive 114 to the plurality of predetermined railroad identifiers. As illustrated in FIG. 7, the user may highlight an individual character 178 of the railroad identifier 176, and subsequently activate the scroll up softkey 162 and/or scroll down softkey 164, to alphabetically vary the individual character 178 of the railroad identifier 176, to correspond to the respectively placed alpha character of the railroad identifier of the first remote locomotive 114. The user subsequently activates the digit left 166 and/or digit right 168 softkeys to highlight the next alpha character of the railroad identifier 176, and similarly activates the scroll up softkey 162 and/or scroll down softkey 164, to alphabetically vary the next alpha character of the railroad identifier 176, to correspond to the respectively placed alpha character of the railroad identifier of the first remote locomotive 114. Alternatively, as illustrated in FIG. 8, if the railroad identifier of the first remote locomotive 114 is not among the predetermined railroad identifiers, the display 143 may output a new railroad identifier 176 called "NEW," which may be edited by the user by activating the softkeys 162, 164, 166, 168, as discussed previously. For example, if the first remote locomotive 114 railroad identifier was "KCS," while the first character "N" was activated, the user would activate the scroll down softkey 164 until the first character displayed "K." The user would then activate the digit right softkey 168, and activate the scroll down softkey 164 until the second character displayed "C," for example.

After the user has activated the appropriate softkeys 162, 164, 166, 168, and the displayed railroad identifier 176 is the railroad identifier of the first remote locomotive 114, the user activates the link softkey 170, which initiates the link communication. The memory 156 of the processor 150 includes a stored predetermined number identifier of the lead locomotive 112. As illustrated in FIG. 3, after the user has inputted the railroad identifier 176 and the number identifier 174 of the first remote locomotive 114, a first transceiver 144 positioned on the lead locomotive 112 transmits a link command signal based on: the predetermined number identifier of the lead locomotive 112 (stored in the memory 156), the inputted railroad identifier 176 of the first remote locomotive 114, and the inputted number identifier 174 of the first remote locomotive 114. A second transceiver 146 positioned on the first remote locomotive 114 receives the link command signal, and communicates the link command signal to a second processor 152. The second processor 152 respectively compares the predetermined number identifier of the lead locomotive 112, the inputted railroad identifier 176 of the first remote locomotive 114, and the inputted number identifier 174 of the first remote locomotive 114 from the link command signal with the inputted number identifier of the lead locomotive 112 (entered at the input interface 145), a predetermined railroad identifier of the first remote locomotive 114, and a predetermined number identifier of the first remote locomotive 114, which are stored in a memory 158 of the second processor 152. In an exemplary embodiment, if the predetermined number identifier of the lead locomotive 112, the inputted railroad identifier 176, and the inputted number identifier 174 respectively match the respective inputted number identifier of the lead locomotive 112, the predetermined railroad identifier, and predetermined number identifier of the first remote locomotive 114, the second processor 152 commands the second transceiver 146 to transmit a link reply signal. The first transceiver 144 subsequently receives the link reply signal, and the communication link 120 is established.

Once the communication link 120 between the lead locomotive 112 and the first remote locomotive 114 has been established, this process may be repeated for establishing a communication link with the second remote locomotive 116 (if desired): the user inputs the railroad identifier 176 and the number identifier 174 of the second remote locomotive 116 into the input interface 142; the user inputs the number identifier of the lead locomotive 112 into the input interface 147 on the second remote locomotive 116; the first transceiver 144 transmits a link communication signal based on the predetermined number identifier of the lead locomotive 112 (from the memory 156), the inputted railroad identifier 176, and the number identifier 174 of the second remote locomotive 116; a third transceiver 148 positioned on the second remote locomotive 116 receives the link communication signal; a third processor 154 respectively compares the predetermined number identifier of the lead locomotive 112, the inputted railroad, and the number identifier of the second remote locomotive 116 with the inputted number identifier of the lead locomotive 112, a predetermined railroad identifier of the second remote locomotive 116, and a predetermined number identifier of the second remote locomotive 116 (stored in a memory 160 of the third processor 154); and the third transceiver 148 transmits a link reply signal which subsequently establishes a communication link 120 between the lead locomotive 112 and the second remote locomotive 116.

When the first transceiver 144 transmits the first link command signal including the railroad identifier 176 and the number identifier 174 of the first remote locomotive 114, the third transceiver 148 receives this signal, the third processor 154 determines that the railroad identifier 176 and/or the number identifier 174 within the link command signal do not match the respective predetermined railroad and number identifier of the second remote locomotive 116, and thus the third transceiver 148 does not transmit a link reply signal. Similarly, when the first transceiver 144 transmits the second link command signal including the railroad identifier 176 and the number identifier 174 of the second remote locomotive 116, the second transceiver 146 receives this signal, the second processor 152 determines that the railroad identifier 176 and/or the number identifier 174 within the link command signal do not match the respective predetermined railroad and number identifier of the first remote locomotive 114, and thus the second transceiver 146 does not transmit a link reply signal. For example, if the railroad and number identifier of the first remote locomotive 114 is "UP2000," and the railroad and number identifier of the second remote locomotive 116 is "BN2000," the first link command signal would include "UP2000," and the third processor 154 would determine that the railroad identifier "UP" in the link command signal does not match the predetermined railroad identifier "BN" of the second remote locomotive 116, and thus no link reply signal would be transmitted from the third transceiver 148. Similarly, the second link command signal would include "BN2000," and the second processor 152 would determine that the railroad identifier "BN" in the link command signal does not match the predetermined railroad identifier "UP" of the first remote locomotive 114, and thus no link reply signal would be transmitted from the second transceiver 146. FIG. 9 illustrates a table of sample railroad identifiers for some established railroads. However, this table is merely exemplary, and may be modified and/or expanded, based on updated information and established standards.

Although the above embodiments of the present invention discuss a lead locomotive establishing a communication link with one or more remote locomotives on the same train as the lead locomotive, the present invention is not limited to these embodiments. FIG. 4 illustrates a system 110 in accordance with an exemplary embodiment of the present invention, in which a lead locomotive 183 and a remote locomotive 184 are coupled together on a first train 180, and a lead locomotive 185 and a remote locomotive 186 are coupled together on a second train 182. The locomotives 183, 184, 185, 186 include respective transceivers 188, 189, 190, 191 and respective processors 192, 193, 194, 195, with similar properties and function to the transceivers and processors of the locomotives discussed above. Using the linking procedures discussed above, the lead locomotive 183 may establish a communication link 120 with the remote locomotive 184, but not with the remote locomotive 186. As with the locomotives discussed above, the locomotives 183, 184, 185, 186 are assigned a respective railroad identifier and a number identifier, and the lead locomotives 183, 185 include an input interface (not shown), where the user may input the railroad interface and the number interface of the respective remote locomotive 184, 186 where the communication link 120 is desired. As with the embodiments discussed above, the user in the lead locomotives 183, 185 follows a sequential sequence of inputting the railroad identifier and number identifier of the respective remote locomotive 184, 186 within its own train 180, 182, the user in the remote locomotives 184, 186 input the number identifier of the respective lead locomotive 183, 185 within their own train 180, 182, before the user in the lead locomotive activates the link command, and waits for the link reply signal such that each lead locomotive 183, 185 establishes a communication link with the respective remote locomotive 184,186 located within its own train 180, 182.

Figure 10:
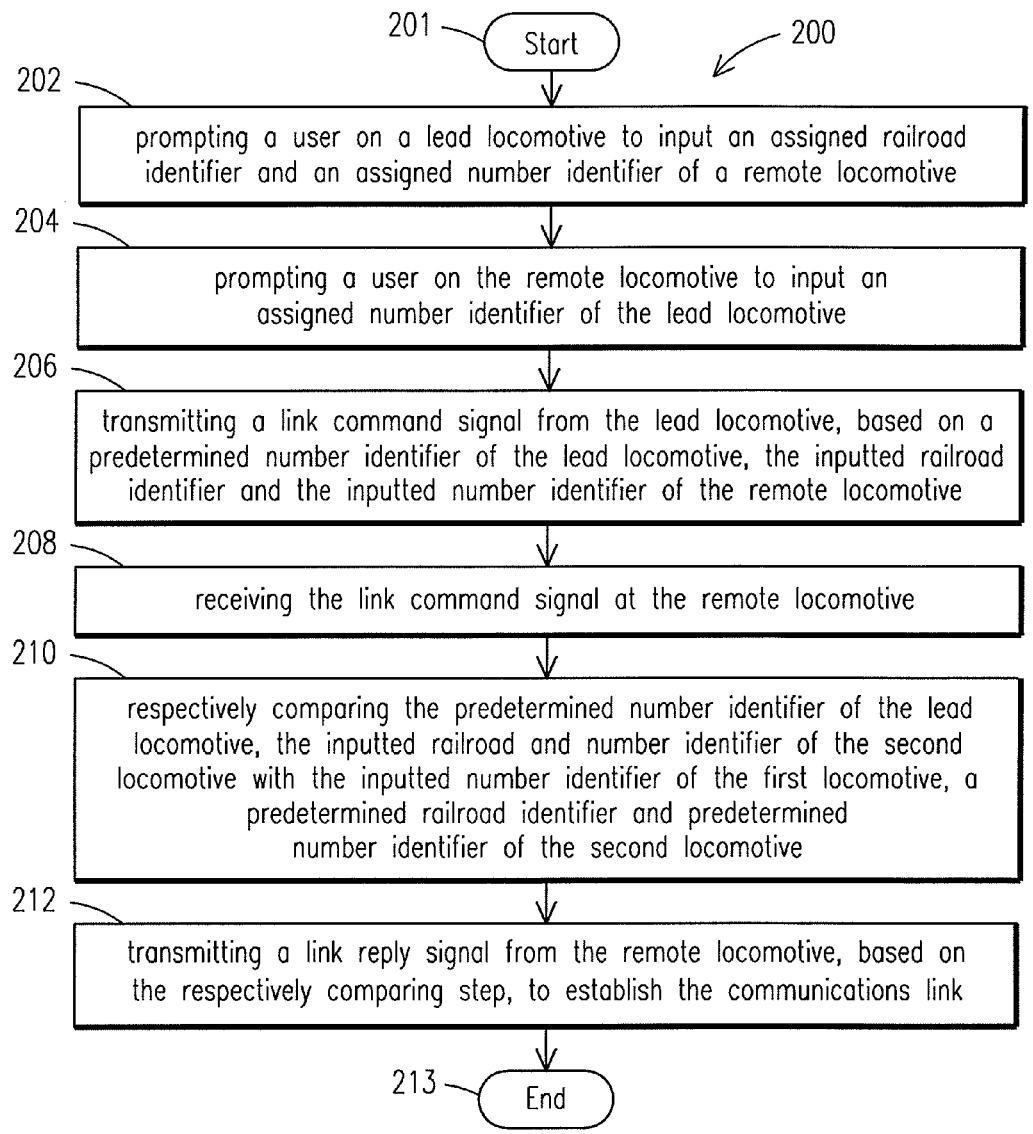
FIG. 10 is a flowchart depicting a method for establishing a wireless-based communication link between a pair of locomotives positioned within a distributed power train, in accordance with an exemplary embodiment of the present invention.

FIG. 10 illustrates an exemplary embodiment of a method 200 for establishing a wireless-based communication link 120 between a pair of locomotives including a lead locomotive 112 and a remote locomotive 114. The method 200 begins at 201 by prompting 202 a user on the lead locomotive to input an assigned railroad identifier 176 and an assigned number identifier 174 of the remote locomotive 114. The method further includes prompting 204 a user on the remote locomotive 114 to input an assigned number identifier of the lead locomotive 112. The method 200 further includes transmitting 206 a link command signal from the lead locomotive 112, based on a predetermined number identifier of the lead locomotive 112, the inputted railroad identifier 176, and the inputted number identifier 174 of the remote locomotive 114. The method 200 further includes receiving 208 the link command signal at the remote locomotive 114. The method 200 further includes respectively comparing 210 the predetermined number identifier of the lead locomotive 112, the inputted railroad identifier of the second locomotive, and the inputted number identifier of the second locomotive with the inputted number identifier of the first locomotive, a predetermined railroad identifier of the second locomotive, and a predetermined number identifier of the second locomotive. The method 200 further includes transmitting 212 a link reply signal from the remote locomotive 114, based on the respectively comparing 210, to establish the communications link 120, before ending at 213.

Additionally, the method includes transmitting a link command signal from the first locomotive. The method further includes receiving the link command signal at the second locomotive. Additionally, the method includes respectively comparing the predetermined number identifier of the first locomotive, the inputted railroad identifier of the second locomotive, and the inputted number identifier of the second locomotive with the inputted number identifier of the first locomotive, a predetermined railroad identifier of the second locomotive, and a predetermined number identifier of the second locomotive. The method further includes transmitting a link reply signal from the second locomotive, based on the respectively comparing step, to establish the communication link.

Figure 11:
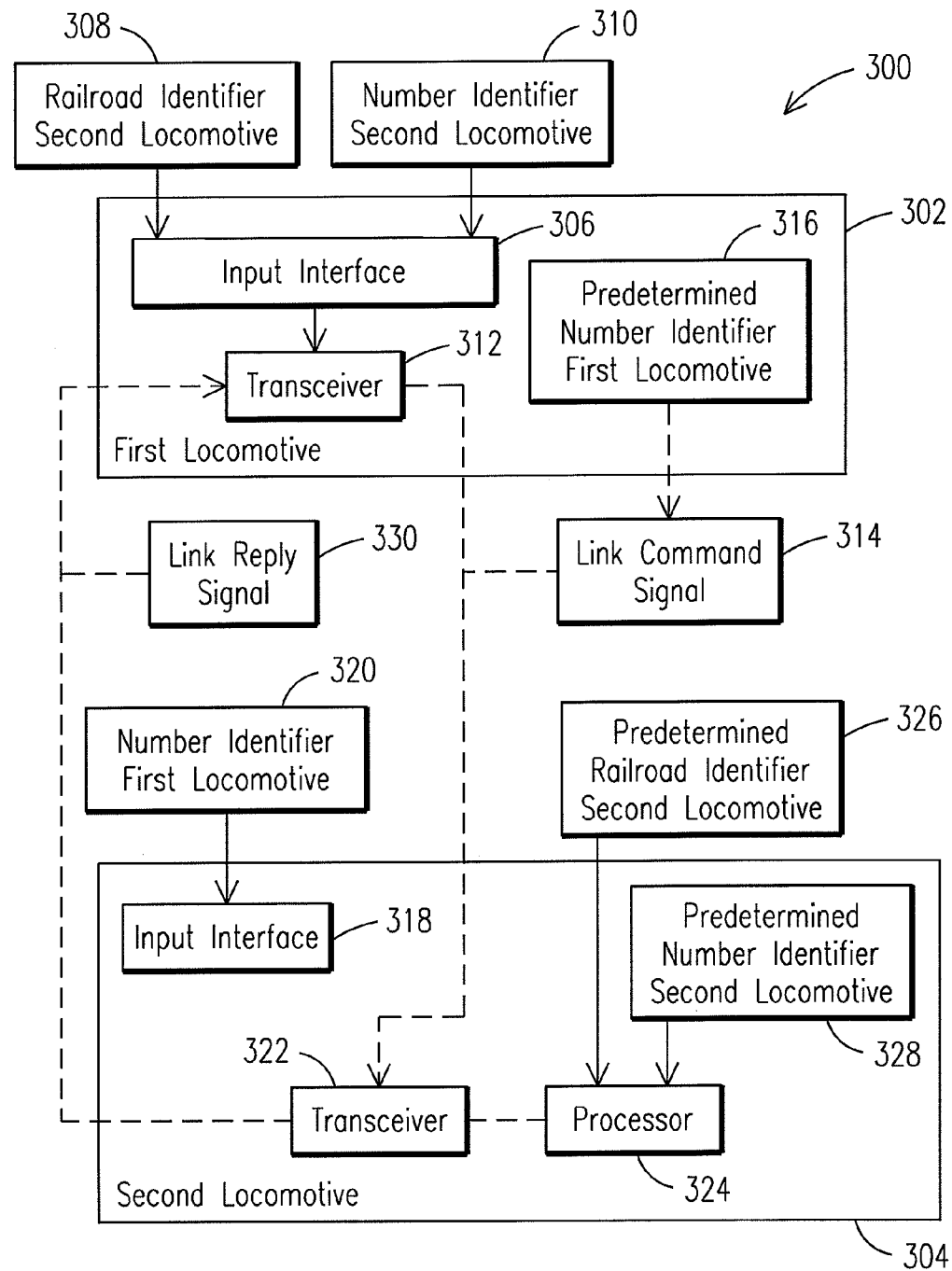
FIG. 11 is a schematic diagram of wireless signaling in a system for establishing a wireless communication link between a plurality of locomotives, according to another embodiment of the present invention.

FIG. 11 illustrates an additional embodiment of the present invention, which relates to a system 300 for establishing a communication link (e.g., wireless communication link) between a plurality of locomotives, e.g., between a first locomotive 302 and a second locomotive 304. In this embodiment, the system 300 comprises a first input interface 306 positioned on the first locomotive 302. The first input interface 306 is configured to prompt a user to input a railroad identifier 308 of the second locomotive 304 and a number identifier 310 of the second locomotive 304. The system 300 further comprises a first transceiver 312 positioned on the first locomotive 302. The first transceiver 312 is configured to transmit a link command signal 314 based on a predetermined number identifier 316 of the first locomotive 302, the inputted railroad identifier 308 of the second locomotive 304, and the inputted number identifier 310 of the second locomotive 304. The system 300 further comprises a second input interface 318 positioned on the second locomotive 304. The second input interface 318 is configured to prompt a user to input a number identifier 320 of the first locomotive 302. The system 300 still further comprises a second transceiver 322 positioned on the second locomotive 304. The second transceiver 322 is configured to receive the link command signal 314. The second transceiver 322 is coupled to a second processor 324. ("Second" is an arbitrary designation.) The second processor 324 is configured to respectively compare the predetermined number identifier 316 of the first locomotive 302, the inputted railroad identifier 308 of the second locomotive 304, and the inputted number identifier 310 of the second locomotive 304 with the inputted number identifier 320 of the first locomotive 302, a predetermined railroad identifier 326 of the second locomotive 304, and a predetermined number identifier 328 of the second locomotive 304. The second transceiver 322 is configured to transmit a link reply signal 330 based on the comparisons performed by the second processor 324, to establish the wireless communication link. The established communication link may be used for the exchange of distributed power control commands between the locomotives.

Another embodiment of the present invention relates to a system for establishing a communication link (e.g., wireless communication link) between a plurality of locomotives. The system comprises an input interface positioned on a first locomotive, e.g., a lead locomotive. The input interface is configured to prompt a user to input a railroad identifier of a second locomotive and a number identifier of the second locomotive. (The second locomotive is a remote or other locomotive that the user would like to link to the first locomotive for distributed power control purposes.) The railroad identifier is uniquely associated with a railroad company that owns and/or controls the second locomotive. Additionally, the number identifier of the second locomotive uniquely identifies the second locomotive within a fleet of locomotives owned and/or controlled by the railroad company that owns and/or controls the second locomotive. The system also comprises a first transceiver positioned on the first locomotive. The first transceiver is configured to transmit a link command signal based on a predetermined number identifier of the first locomotive, the inputted railroad identifier of the second locomotive, and the inputted number identifier of the second locomotive. The system further comprises a second transceiver positioned on the second locomotive and responsive to the link command signal, e.g., the link command signal is received at the second transceiver of the second locomotive, and subsequent distributed power control operations are carried out at the second locomotive based on distributed power commands received wirelessly from the first locomotive.

Another embodiment relates to a method for establishing a communication link (e.g., wireless communication link) between a plurality of locomotives. The method comprises transmitting a respective link command signal from a first locomotive to each of a plurality of second locomotives. The respective link command signal for each second locomotive is based on a railroad identifier of the second locomotive and a number identifier of the second locomotive. The railroad identifier of the second locomotive is uniquely associated with a railroad company that owns and/or controls the second locomotive. Additionally, the number identifier of the second locomotive uniquely identifies the second locomotive within a fleet of locomotives owned and/or controlled by the railroad company that owns and/or controls the second locomotive. The method further comprises, at each second locomotive, controlling the second locomotive based on the respective link command signal received from the first locomotive (by which it is meant that the second locomotive is controlled for receiving and acting upon distributed power control commands that are subsequently received from the first locomotive, as a result of having received the link command signal that included the railroad identifier and number identifier of the second locomotive).

Figure 12:
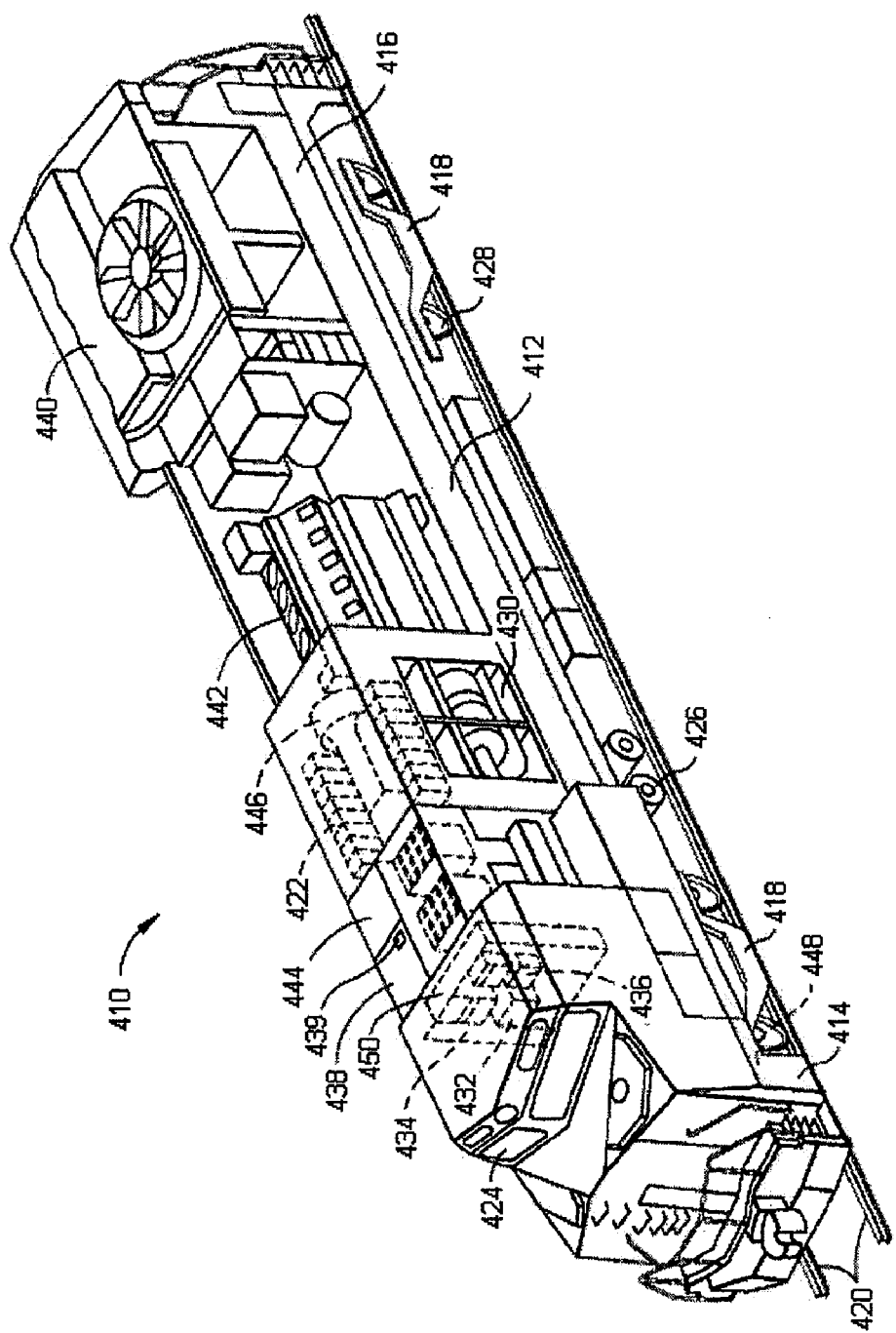
FIG. 12 is a partial cut away view of an exemplary off-highway vehicle (OHV) in accordance with an exemplary embodiment of the present invention.

FIG. 12 is a partial cut away view of an exemplary off-highway vehicle (OHV) in accordance with another embodiment of the present invention. In the exemplary embodiment, the OHV is a locomotive 410. Locomotive 410 includes a platform 412 having a first end 414 and a second end 416. A propulsion system 418 or truck is coupled to platform 412 for supporting and propelling platform 412 on a pair of rails 420. An equipment compartment 422 and an operator cab 424 are coupled to platform 412. An air and air brake system 426 provides compressed air to the locomotive 410, which uses the compressed air to actuate a plurality of air brakes 428 on the locomotive 410 and railcars (not shown) behind it. An auxiliary alternator system 430 supplies power to all auxiliary equipment and is also utilized to recharge a plurality of battery blocks that will be discussed below. An intra-consist communications system 432 collects, distributes, and displays consist data across all locomotives in a consist.

A cab signal system 434 links the wayside (not shown) to a train control system 436. In particular, the cab signal system 434 receives coded signals from a pair of rails 420 through track receivers (not shown) located on the front and rear of the locomotive. The information received is used to inform the locomotive operator of the speed limit and operating mode. A distributed power control system 438 enables remote control capability of multiple locomotives coupled in the train. System 438 also provides for control of tractive power in motoring and braking, as well as air brake control.

In the exemplary embodiment, the distributed power control system 438 includes a distributed power linking system 439 for establishing communications between a lead locomotive and one or more remote locomotives in a train consist. In the exemplary embodiment, the distributed power linking system 439 includes an input device (also referred to as an input interface) configured to receive locomotive identifiers, wherein the locomotive identifiers include a road number or other number identifier associated with a respective locomotive and a railroad number associated with an at least one of an owner and an operator of the respective locomotive. The distributed power linking system 439 also includes a processor communicatively coupled to the input device. The processor is programmed to generate at least one of a request message (also referred to as a link command signal) and a reply message (also referred to as a link reply signal) including the locomotive identifiers and to establish a distributed power system link using the messages. Distributed power linking system 439 includes a transceiver configured to at least one of transmit and receive the request message and the reply message. The transceiver may transmit and receive wirelessly or over a wired system. As described herein, distributed power linking system 439 may be a separate standalone system or may comprise components of other existing systems to accomplish the functions of distributed power linking system 439. For example, the transceiver may be a radio transceiver dedicated to distributed power linking system 439 or may be an existing transceiver that is used by distributed power linking system 439 when needed using an interface that permits distributed power linking system 439 to communicate with the transceiver. The input device comprises a man-machine interface such as but not limited to a keypad, a touch screen, a graphical interface, or an optical or magnetic reader. The input device may be wirelessly coupled to the processor or may be hardwired either temporarily through a quick disconnect or a permanent connection.

An engine cooling system 440 enables the engine 442 and other components to reject heat to cooling water. In addition, system 440 facilitates minimizing engine thermal cycling by maintaining an optimal engine temperature throughout the load range, and facilitates preventing overheating in tunnels. An equipment ventilation system 444 provides cooling to locomotive 410 equipment.

A traction alternator system 446 converts mechanical power to electrical power which is then provided to propulsion system 418. Propulsion system 418 enables locomotive 410 to move and includes at least one traction motor 448 and dynamic braking capability. In particular, propulsion system 418 receives power from traction alternator 446, and through traction motors 448 moves locomotive 410. Locomotive 410 systems are monitored and/or controlled by an energy management system 450.

Energy management system 450 generally includes at least one computer that is programmed to perform the functions described herein. The term "computer," as used herein, is not limited to just those integrated circuits referred to in the art as a computer, but broadly refers to a processor, a microprocessor, a microcontroller, a programmable logic controller, an application specific integrated circuit, and another programmable circuit, and these terms are used interchangeably herein.

Figure 13:
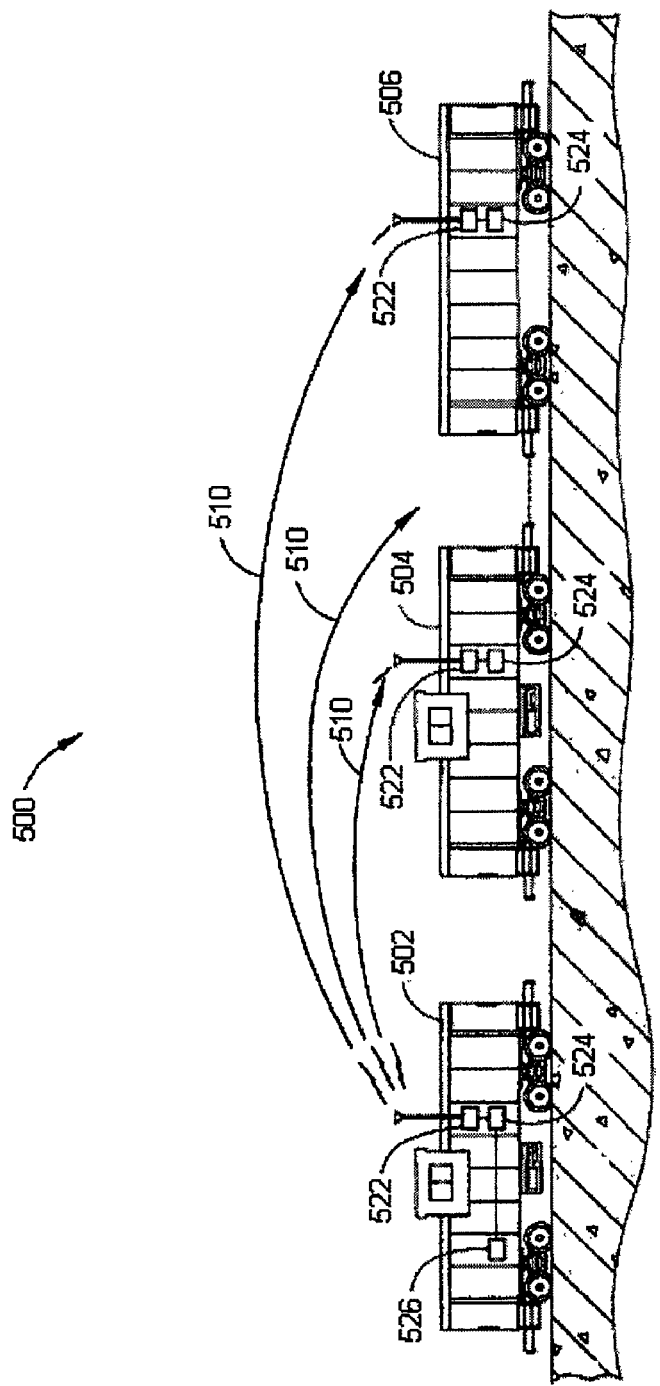
FIG. 13 is a schematic block diagram of a train consist in accordance with an exemplary embodiment of the present invention.

FIG. 13 is a schematic block diagram of a train consist 500 in accordance with an exemplary embodiment of the present invention. In the exemplary embodiment, consist 500 includes a lead locomotive 502 and remote locomotives 504 and 506. Each of locomotives 502, 504, and 506 are associated with a number identifier, for example, but not limited to, a road number. Typically, a road number is displayed prominently on an exterior of locomotives 502, 504, and 506 as well as on paperwork and communications links associated with locomotives 502, 504, and 506. As such, the road number (or other number identifier) associated with a locomotive is unique to that locomotive in a fleet of locomotives operated by a business entity. However, as explained above, if the consist 500 comprises locomotives normally operated by another business entity, more than one locomotive in the consist 500 may have identical number identifiers. For example, locomotive 504 may be operated by a first railroad company that assigned a number identifier of "12345" to locomotive 504. Moreover locomotive 506 may be operated by a second railroad company that also assigned a number identifier of "12345" to locomotive 506.

Each locomotive 502, 504, and 506 may include a transceiver 522 for transmitting and receiving information over a communications link 510 (such as a radio communication link) and a processor 524 for processing received signals and generating information to be transmitted via transceiver 522 over communication link 510.

In an aspect of the invention, one or more processors 524 may be configured for performing a method of linking the locomotives 502, 504, and 506 using communications link 510, for distributed power operations (e.g., the communication link is used for carrying out coordinated distributed power operations between the plurality of locomotives). The steps necessary for accomplishing the method may be embodied in hardware, software, and/or firmware in any form that is accessible and executable by processor 524 and may be stored on any medium that is convenient for the particular application. Processor 524 may take any form known in the art, for example an analog or digital microprocessor or computer, and it may be integrated into or combined with one, or more controllers used for other functions related to the locomotive operations.

The term processor, as used herein, refers to central processing units, microprocessors, microcontrollers, reduced instruction set circuits (RISC), application specific integrated circuits (ASIC), logic circuits, and any other circuit or processor capable of executing the functions described herein.

As used herein, the terms "software" and "firmware" are interchangeable, and include any computer program stored in memory for execution by processor 524, including RAM memory, ROM memory, EPROM memory, EEPROM memory, and non-volatile RAM (NVRAM) memory. The above memory types are exemplary only, and are thus not limiting as to the types of memory usable for storage of a computer program.

As will be appreciated based on the foregoing specification, the above-described embodiments of the disclosure may be implemented using computer programming or engineering techniques including computer software, firmware, hardware or any combination or subset thereof, wherein the technical effect is for linking a lead locomotive with at least one remote locomotive in a train controlled by a distributed power system wherein each of the lead locomotive and the at least one remote locomotive include a distributed power control system. Any such resulting program, having computer-readable code means, may be embodied or provided within one or more computer-readable media, thereby making a computer program product, i.e., an article of manufacture, according to the discussed embodiments of the disclosure. The computer readable media may be, for example, but is not limited to, a fixed (hard) drive, diskette, optical disk, magnetic tape, semiconductor memory such as read-only memory (ROM), and/or any transmitting/receiving medium such as the Internet or other communication network or link. The article of manufacture containing the computer code may be made and/or used by executing the code directly from one medium, by copying the code from one medium to another medium, or by transmitting the code over a network.

Figure 14:
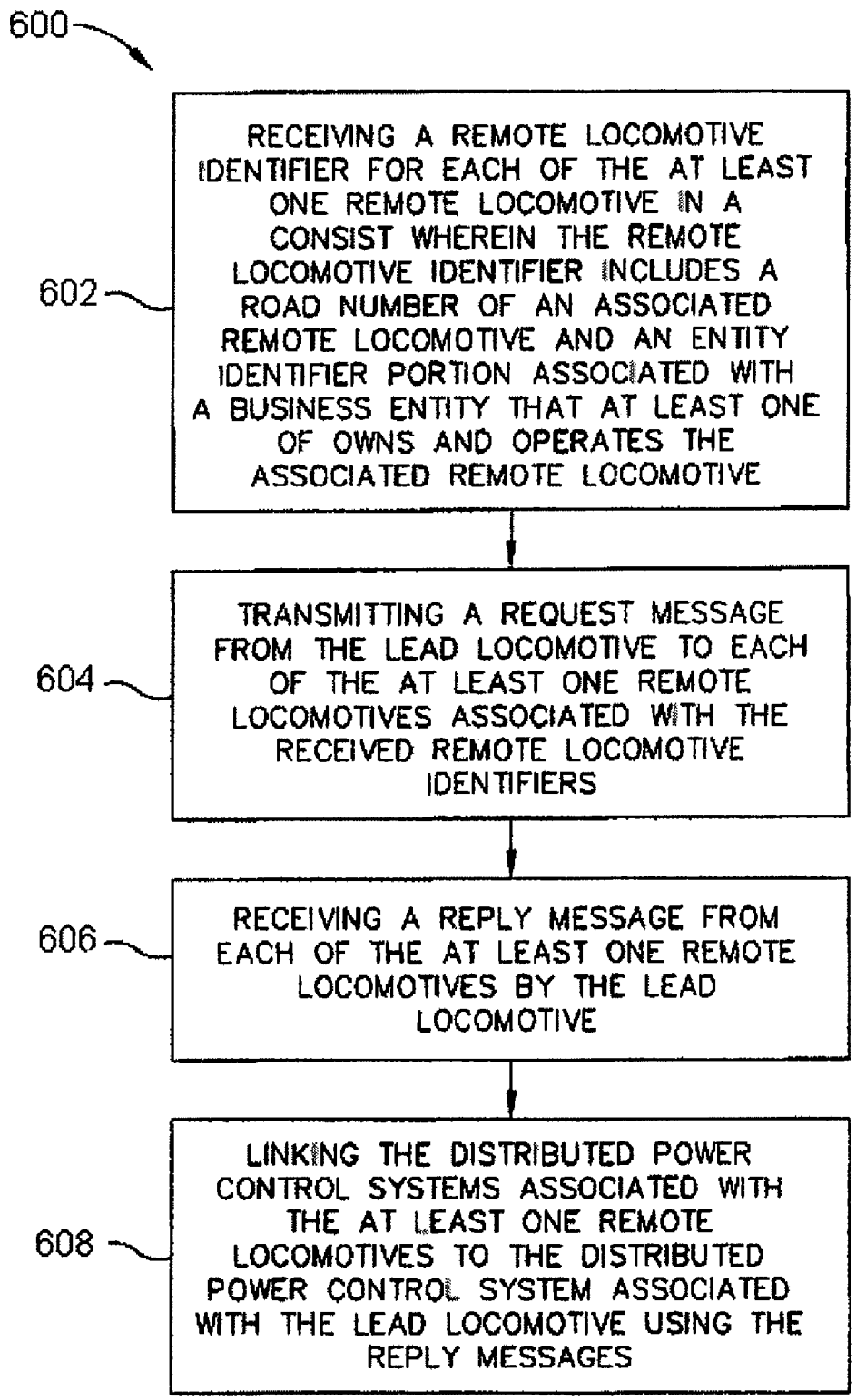
FIG. 14 is a flowchart of a method of communicatively linking a lead locomotive to a remote locomotive in accordance with an exemplary embodiment of the present invention.

FIG. 14 is a flowchart of a method 600 for communicatively linking a lead locomotive (or, more generally, a first locomotive) to a remote locomotive (or, more generally, a second locomotive) in accordance with an exemplary embodiment of the present invention. In the exemplary embodiment, method 600 includes receiving 602 a remote locomotive identifier. The remote locomotive identifier includes a unit identifier associated with that particular locomotive, for example, the number identifier (e.g., road number) of the locomotive. The remote locomotive identifier may also include another identifier portion, such as a railroad identifier that identifies the entity that owns or operates the locomotive. In the exemplary embodiment, the remote locomotive identifier is received 602 by a distributed power system onboard a locomotive that has been designated the lead locomotive of a train. The remote locomotive identifier identifies the locomotives that have been designated to be the remote locomotives in the train that the lead locomotive will control through their respective distributed power system controllers. The identifier of the lead locomotive is input into the distributed power system controller of each remote locomotive during the linking process. Each remote locomotive will then respond to messages from the designated lead locomotive that is addressed to the remote locomotive.

Method 600 also includes automatically transmitting 604 a link command signal (request message) from the lead locomotive to each of the at least one remote locomotives. The link command signal is addressed to one of the designated remote locomotives and is transmitted from the lead locomotive. The message includes the remote locomotive identifier for the locomotive to which the message is sent, the lead locomotive identifier. Method 600 includes automatically receiving 606 a link reply signal (reply message) from each of the at least one remote locomotives by the lead locomotive and linking 608 the distributed power control systems associated with the at least one remote locomotives to the distributed power control system associated with the lead locomotive using the link reply signals.

If there is more than one designated remote locomotive, the lead locomotive cycles through a list of the designated remote locomotive identifiers and transmits a message to each listed remote locomotive in turn and receives a link reply signal from each remote locomotive. In an alternative embodiment, the identifiers of the remote locomotives are not entered into the power distribution system of the lead locomotive but rather, the lead locomotive transmits a link command signal and waits for all remote locomotives that have had the identifier of the lead locomotive entered into their distributed power system. Although it is indicated herein that the identifiers of the lead and remote locomotives are entered directly into the distributed power systems, it should be understood the identifiers may be entered into any control system, data system, or any input device, which would then transmit the identifiers to the communication linking subsystem on each respective locomotive.

The above-described embodiments of a method and system of linking distributed power systems in a train consist provides a cost-effective and reliable means linking remote locomotives to a lead locomotive even if any of the remote locomotives has a number identifier that is identical to the number identifier of the lead locomotive or any of the other remote locomotives. More specifically, the methods and systems described herein facilitate building trains using readily available locomotives. As a result, the methods and systems described herein facilitate operating rail resources in a cost-effective and reliable manner.

The term "number identifier" as used herein refers to any alphanumeric identifier, and not just to a number-only identifier, unless otherwise specified.

While various embodiments of the present invention have been shown and described herein, it will be obvious that such embodiments are provided by way of example only. Numerous variations, changes and substitutions may be made without departing from the invention herein. Accordingly, it is intended that the invention be limited only by the spirit and scope of the appended claims.

That which is claimed:

1. A distributed power linking system for establishing a communication link between a plurality of locomotives, said system comprising:
a first input interface positioned on a first locomotive, said first input interface being configured to receive locomotive identifiers, said locomotive identifiers comprising a number identifier and a railroad identifier both associated with a second locomotive, said railroad identifier associated with an at least one of an owner or an operator of the second locomotive;
a first processor communicatively coupled to said first input interface, said first processor configured to generate a link command signal relating to the locomotive identifiers; and
a first transceiver configured to transmit the link command signal to the second locomotive and to receive a link reply signal from the second locomotive,
wherein the first processor is configured to establish a distributed power communication link between the first locomotive and the second locomotive based on at least one of the link command signal or the link reply signal.

2. The system of claim 1, wherein:
the first input interface is configured to prompt a user to input the railroad identifier and the number identifier of the second locomotive;
the first transceiver is configured to transmit the link command signal based on a predetermined number identifier of the first locomotive, the inputted railroad identifier of the second locomotive, and the inputted number identifier of the second locomotive; and
the system further comprises:
a second input interface positioned on the second locomotive, said second input interface being configured to prompt a user to input a number identifier of the first locomotive; and
a second transceiver positioned on the second locomotive, said second transceiver configured to receive the link command signal; said second transceiver being coupled to a second processor, said second processor configured to respectively compare the predetermined number identifier of the first locomotive, the inputted railroad identifier of the second locomotive, and the inputted number identifier of the second locomotive with the inputted number identifier of the first locomotive, a predetermined railroad identifier of the second locomotive, and a predetermined number identifier of the second locomotive; and said second transceiver is configured to transmit the link reply signal based on the comparisons performed by the second processor, to establish the communication link.

3. The system of claim 2, wherein:
the first locomotive is a lead locomotive of a train, and the second locomotive is a first remote locomotive of the train;
the plurality of locomotives further includes a third locomotive which is a second remote locomotive of the train, said second remote locomotive being assigned a respective railroad identifier and a respective number identifier;
the system further comprises a third input interface positioned on the second remote locomotive, said third input interface being configured to prompt the user to input the number identifier of the lead locomotive subsequent to the established communication link between the lead and first remote locomotive;
said first input interface on the lead locomotive is configured to prompt the user to input the railroad identifier and the number identifier of the second remote locomotive subsequent to establishment of the communication link between the lead and first remote locomotive;
said first transceiver is configured to transmit a second link command signal, based on the predetermined number identifier of the lead locomotive, the inputted railroad identifier of the second remote locomotive, and the inputted number identifier of the second remote locomotive, to a third transceiver positioned on the second remote locomotive;
the third transceiver is coupled to a third processor, which is configured to respectively compare the predetermined number identifier of the lead locomotive, the inputted railroad identifier of the second remote locomotive, and the inputted number identifier of the second remote locomotive with the inputted number identifier of the lead locomotive, a predetermined railroad identifier of the second remote locomotive, and a predetermined number identifier of the second remote locomotive; and said third transceiver is configured to transmit a second link reply signal based on the comparisons performed by the third processor to establish a second communication link with the lead locomotive.

4. The system of claim 2, wherein the second transceiver is configured to transmit the link reply signal based on a valid respective comparison of the predetermined number identifier of the first locomotive, the inputted railroad identifier of the second locomotive, and the inputted number identifier of the second locomotive with the inputted number identifier of the first locomotive, the predetermined railroad identifier of the second locomotive, and the predetermined number identifier of the second locomotive.

5. The system of claim 2, wherein:
the first processor has a first memory, the first memory being programmed with a radio version code and a plurality of predetermined railroad identifiers associated with the radio version code; and
the first input interface includes a plurality of softkeys and is configured for:
prompting the user to select the railroad identifier of the second locomotive from among the plurality of predetermined railroad identifiers, and input the selected predetermined railroad identifier as the railroad identifier of the second locomotive; and
prompting the user to input the number identifier of the second locomotive.

6. The system of claim 5, wherein said softkeys include at least one of a shift right, shift left, shift up, and/or shift down softkey; wherein said shift left and/or shift right softkeys are utilized to selectively activate a character among the railroad identifier and the number identifier; and wherein said shift up and/or shift down softkeys are utilized to search through the plurality of predetermined railroad identifiers and to vary a numeric value of the number identifier, depending on the selectively activated character among the railroad identifier and the number identifier.

7. The system of claim 2, wherein:
the first processor has a first memory, the first memory being programmed with a radio version code and a plurality of predetermined railroad identifiers associated with the radio version code; and
the first input interface includes a plurality of softkeys and is configured for:
prompting the user to search the plurality of predetermined railroad identifiers to determine if the railroad identifier of the second locomotive is stored in the first memory;
prompting the user to update the radio version code to add the railroad identifier of the second locomotive to the plurality of predetermined railroad identifiers, subsequently select the railroad identifier of the second locomotive from among the plurality of predetermined railroad identifiers, and input the selected predetermined railroad identifier as the railroad identifier of the second locomotive; and
prompting the user to input the number identifier of the second locomotive.

8. The system of claim 2, wherein:
the second processor includes a second memory, and the second processor is programmed with a radio version code such that a plurality of predetermined railroad identifiers including the predetermined railroad identifier of the second locomotive, is stored in the second memory; and the second processor is configured to compare the inputted railroad identifier of the second locomotive with the predetermined railroad identifier of the second locomotive, said second transceiver being configured to transmit the link reply signal based upon a valid comparison.

9. The system of claim 2, wherein the user is initially prompted to input the railroad identifier, and is subsequently prompted to input the number identifier of the second locomotive; and wherein said railroad identifier is limited to a maximum number of alpha characters and said number identifier is limited to a maximum number of numeric characters.

10. The system of claim 1, wherein the first processor is configured to sequentially generate at least one of a link command signal and a link reply signal including the locomotive identifiers for a plurality of remote locomotives, and to receive a link reply signal from a remote locomotive before sending the link command signal to the next remote locomotive of the plurality of remote locomotives.

11. A system for establishing a communication link between a lead locomotive and a remote locomotive, said lead locomotive and remote locomotive each being assigned a respective railroad identifier and a respective number identifier, said system comprising:
a first input interface positioned on the lead locomotive, said first input interface being configured to prompt a user to input the railroad identifier of the remote locomotive and the number identifier of the remote locomotive; wherein a link command signal, based on a predetermined number identifier of the lead locomotive, the inputted railroad identifier of the remote locomotive, and the inputted number identifier of the remote locomotive, is transmitted from the lead locomotive, and is received at the remote locomotive;
a second input interface positioned on the remote locomotive, said second input interface being configured to prompt a user to input the number identifier of the lead locomotive; and
a second processor positioned on the remote locomotive, which is configured to respectively compare the predetermined number identifier of the lead locomotive, the inputted railroad identifier of the remote locomotive, and the inputted number identifier of the remote locomotive from the link command signal, with the inputted number identifier of the lead locomotive, a predetermined railroad identifier of the remote locomotive, and a predetermined number identifier of the remote locomotive; wherein a link reply signal, based on the comparison performed by the second processor, is transmitted from the remote locomotive, to establish the communication link.

12. A method for establishing a communication link between a first locomotive and a second locomotive, said method comprising:
inputting, at the second locomotive, an assigned number identifier of the first locomotive;
inputting, at the first locomotive, an assigned railroad identifier and an assigned number identifier of the second locomotive;
transmitting a link command signal from the first locomotive to the second locomotive, the link command signal relating to a predetermined number identifier of the first locomotive, the inputted railroad identifier of the second locomotive, and the inputted number identifier of the second locomotive;
transmitting a link reply signal from the second locomotive to the first locomotive; and linking the first and second locomotives for distributed power operations based on the link reply signal.

13. The method of claim 12, further comprising:
prompting a user on the first locomotive to input the assigned railroad identifier and the assigned number identifier of the second locomotive;
prompting a user on the second locomotive to input the assigned number identifier of the first locomotive;
carrying out a respective comparison of the predetermined number identifier of the first locomotive, the inputted railroad identifier of the second locomotive, and the inputted number identifier of the second locomotive with the inputted number identifier of the first locomotive, a predetermined railroad identifier of the second locomotive, and a predetermined number identifier of the second locomotive; and
transmitting the link reply signal based on the respective comparison.

14. The method of claim 13, wherein:
the first locomotive is a lead locomotive of a train, and the second locomotive is a first remote locomotive of the train;
the train further includes a third locomotive which is a second remote locomotive, said second remote locomotive being assigned a respective railroad identifier and a respective number identifier; and
the method further comprises:
prompting a user on the second remote locomotive to input the assigned number identifier of the lead locomotive subsequent to the established communication link between the lead and first remote locomotive;
prompting a user on the lead locomotive to input the assigned railroad identifier and the assigned number identifier of the second remote locomotive subsequent to the established communication link between the lead and first remote locomotive;
transmitting a second link command signal to the second remote locomotive, based on the predetermined number identifier of the lead locomotive, the inputted railroad identifier of the second remote locomotive and the inputted number identifier of the second remote locomotive;
receiving the second link command signal at the second remote locomotive;
carrying out a second respective comparison of the predetermined number identifier of the lead locomotive, the inputted railroad identifier of the second remote locomotive, and the inputted number identifier of the second remote locomotive with the inputted number identifier of the lead locomotive, a predetermined railroad identifier of the second remote locomotive, and a predetermined number identifier of the second remote locomotive; and
transmitting a second link reply signal from the second remote locomotive, based on the second respective comparison, to establish a second communication link with the lead locomotive.

15. The method of claim 14, wherein said prompting the user on the lead locomotive comprises:
prompting the user to select the assigned railroad identifier of the second remote locomotive from among a plurality of predetermined railroad identifiers;
prompting the user to input the selected predetermined railroad identifier; and
prompting the user to input the number identifier of the second remote locomotive.

16. The method of claim 14, wherein prompting the user on the lead locomotive comprises:
prompting the user to search a plurality of predetermined railroad identifiers to determine if the assigned railroad identifier of the second remote locomotive is among the plurality of predetermined railroad identifiers;
prompting the user to update the plurality of predetermined railroad identifiers to add the assigned railroad identifier of the second remote locomotive; and
prompting the user to select the assigned railroad identifier of the second remote locomotive from among the plurality of predetermined railroad identifiers.

17. A method for establishing a communication link between a plurality of locomotives, said method comprising:
transmitting a respective link command signal from a first locomotive to each of a plurality of second locomotives, wherein the respective link command signal for each second locomotive is based on a railroad identifier of the respective second locomotive and a number identifier of the respective second locomotive, wherein the railroad identifier of the respective second locomotive is uniquely associated with a business entity that owns and/or controls the second locomotive, and wherein the number identifier of the respective second locomotive uniquely identifies the second locomotive within a fleet of locomotives owned and/or controlled by the business entity that owns and/or controls the second locomotive; and
at each second locomotive, controlling the second locomotive based on the respective link command signal received from the first locomotive.

18. A method of communicatively linking a lead locomotive to at least one remote locomotive in a consist of locomotives, said method comprising:
receiving a remote locomotive identifier for each of the at least one remote locomotive in a consist, the remote locomotive identifier including a number identifier of an associated remote locomotive, and the remote locomotive identifier including a railroad number associated with a business entity that at least one of owns or operates the associated remote locomotive;
transmitting a link command signal from the lead locomotive to each of the at least one remote locomotives associated with the received remote locomotive identifier;
receiving a link reply signal from each of the at least one remote locomotives by the lead locomotive; and
linking the lead locomotive to at least one remote locomotive for distributed power operations using the link reply signals.

19. The method of claim 18, wherein transmitting a link command signal from the lead locomotive comprises automatically transmitting a link command signal from the lead locomotive to each of the at least one remote locomotives associated with the received remote locomotive identifier, and wherein receiving a link reply signal comprises automatically receiving a link reply signal from each of the at least one remote locomotives by the lead locomotive.

20. The method of claim 18, wherein transmitting a link command signal from the lead locomotive comprises wirelessly transmitting a link command signal from the lead locomotive to each of the at least one remote locomotives associated with the received remote locomotive identifier.

* * * * *